United States Patent
Ichikawa et al.

(10) Patent No.: US 11,794,788 B2
(45) Date of Patent: *Oct. 24, 2023

(54) AUTOMATIC DRIVING SYSTEM

(71) Applicant: TOYOTA JIDOSHA KABUSHIKI KAISHA, Aichi-ken (JP)

(72) Inventors: Kentaro Ichikawa, Shizuoka-ken (JP); Taisuke Sugaiwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

This patent is subject to a terminal disclaimer.

(21) Appl. No.: 17/566,299

(22) Filed: Dec. 30, 2021

(65) Prior Publication Data

US 2022/0121200 A1 Apr. 21, 2022

Related U.S. Application Data

(63) Continuation of application No. 16/845,818, filed on Apr. 10, 2020, now Pat. No. 11,385,639, which is a
(Continued)

(30) Foreign Application Priority Data

Jul. 13, 2015 (JP) .................................. 2015-139757

(51) Int. Cl.
*B60W 60/00* (2020.01)
*B60W 40/00* (2006.01)
*B60W 50/08* (2020.01)

(52) U.S. Cl.
CPC ........ *B60W 60/0059* (2020.02); *B60W 40/00* (2013.01); *B60W 50/082* (2013.01);
(Continued)

(58) Field of Classification Search
CPC ............... G05D 1/0061; G05D 1/0088; G05D 2201/0213; B60W 40/00; B60W 60/0053;
(Continued)

(56) References Cited

U.S. PATENT DOCUMENTS 5,774,069 A 6/1998 Tanaka et al.
8,670,891 B1 3/2014 Szybalski et al.
(Continued)

FOREIGN PATENT DOCUMENTS

DE 10 2012 213 965 A1 2/2014
DE 10 2012 223 758 A1 3/2014
(Continued)

OTHER PUBLICATIONS

Communication dated Apr. 6, 2018 issued by the U. S. Patent and Trademark Office in U.S. Appl. No. 15/205,767.
(Continued)

*Primary Examiner* — Rami Khatib
(74) *Attorney, Agent, or Firm* — Sughrue Mion, PLLC

(57) ABSTRACT

An automatic driving system includes an electronic control device configured to: detect a driving operation input amount during an automatic driving control for a vehicle; determine whether the driver is able to start manual driving during the automatic driving control for the vehicle; output a signal for performing switching from automatic driving to the manual driving based on a result of a comparison between the driving operation input amount and a driving switching threshold that is a threshold for the switching from the automatic driving to the manual driving; set the driving switching threshold to a first driving switching threshold when it is determined that the driver is able to start the manual driving; and set the driving switching threshold to a second driving switching threshold exceeding the first driv-
(Continued)

ing switching threshold when it is determined that the driver is not able to start the manual driving.

20 Claims, 8 Drawing Sheets

Related U.S. Application Data continuation of application No. 16/028,001, filed on Jul. 5, 2018, now Pat. No. 10,649,452, which is a continuation of application No. 15/205,767, filed on Jul. 8, 2016, now Pat. No. 10,067,505.

(52) U.S. Cl.
CPC ... B60W 60/0053 (2020.02); *B60W 2540/221* (2020.02); *B60W 2540/223* (2020.02); *B60W 2540/225* (2020.02); *B60W 2540/229* (2020.02); *G05D 2201/0213* (2013.01)

(58) Field of Classification Search
CPC ..... B60W 2040/0818; B60W 2420/42; B60W 2540/00; B60W 2540/221; B60W 2540/223; B60W 2540/225
See application file for complete search history.

(56) References Cited

U.S. PATENT DOCUMENTS

| | | | |
|---|---|---|---|
| 9,434,382 | B1 | 9/2016 | Prokhorov et al. |
| 9,671,782 | B2 | 6/2017 | Yamaoka et al. |
| 10,067,505 | B2 | 9/2018 | Ichikawa |
| 10,649,452 | B2 | 5/2020 | Ichikawa |
| 2009/0268022 | A1 | 10/2009 | Omi |
| 2013/0110343 | A1 | 5/2013 | Ichikawa et al. |
| 2013/0131907 | A1* | 5/2013 | Green .................. G05D 1/0055 701/23 |
| 2014/0088814 | A1* | 3/2014 | You ................... B60W 60/0054 701/23 |
| 2015/0066284 | A1 | 3/2015 | Yopp |
| 2015/0142244 | A1 | 5/2015 | You et al. |
| 2016/0039428 | A1 | 2/2016 | Odate |
| 2016/0207527 | A1 | 7/2016 | Hiei et al. |
| 2016/0207536 | A1 | 7/2016 | Yamaoka et al. |
| 2016/0207538 | A1 | 7/2016 | Urano et al. |
| 2016/0355190 | A1 | 12/2016 | Omi |
| 2017/0017233 | A1 | 1/2017 | Ichikawa et al. |
| 2017/0247041 | A1 | 8/2017 | Kim |
| 2018/0329416 | A1 | 11/2018 | Ichikawa et al. |
| 2020/0241528 | A1 | 7/2020 | Ichikawa et al. |

FOREIGN PATENT DOCUMENTS

| | | |
|---|---|---|
| DE | 10 2014 205 830 A1 | 10/2015 |
| DE | 11 2015 000 759 T5 | 11/2016 |
| JP | H02-155843 A | 6/1990 |
| JP | 2006-205794 A | 8/2006 |
| JP | 2006-331323 A | 12/2006 |
| JP | 2011-162132 A | 8/2011 |
| JP | 2012-111263 A | 6/2012 |
| JP | 5382218 B2 | 10/2013 |
| JP | 2015-048034 A | 3/2015 |
| JP | 2016132352 A | 7/2016 |
| JP | 2016-175614 A | 10/2016 |
| WO | 2011/158347 A1 | 12/2011 |

OTHER PUBLICATIONS

U.S. Appl. No. 15/205,767, filed Jul. 8, 2016.
U.S. Appl. No. 16/028,001, filed Jul. 5, 2018.
U.S. Appl. No. 16/845,818, filed Apr. 10, 2020.
Notice of Allowance dated Mar. 22, 2022 in U.S. Appl. No. 16/845,818.

* cited by examiner

AUTOMATIC DRIVING SYSTEM

INCORPORATION BY REFERENCE

This is a continuation of U.S. application Ser. No. 16/845,818 filed Apr. 10, 2020, which is a continuation of U.S. application Ser. No. 16/028,001 filed Jul. 5, 2018 (now U.S. Pat. No. 10,649,452 issued May 12, 2020), which is a continuation of U.S. application Ser. No. 15/205,767 filed Jul. 8, 2016 (now U.S. Pat. No. 10,067,505 issued Sep. 4, 2018), which claims priority to Japanese Patent Application No. 2015-139757 filed on Jul. 13, 2015. The entire disclosures of the prior applications are considered part of the disclosure of the accompanying continuation application, and are hereby incorporated herein by reference in its entirety.

BACKGROUND OF THE INVENTION

1. Field of the Invention

The invention relates to an automatic driving system for a vehicle.

2. Description of Related Art

An automatic driving device disclosed in U.S. Pat. No. 8,670,891 is known with regard to an automatic driving control for a vehicle. In this automatic driving device, automatic driving for the vehicle is executed, and the automatic driving is switched to manual driving during the execution of the automatic driving in a case where any one of the amounts of a steering wheel operation input, an accelerator operation input, and a brake operation input by a driver of the vehicle during the automatic driving is equal to or greater than a predetermined threshold.

SUMMARY OF THE INVENTION

It is conceivable that the automatic driving device described above is subject to the switching to the manual driving as a result of the driver's unintended manual driving operation input during the automatic driving. In a case where the driver depresses the accelerator pedal by mistake, for example, the vehicle might be subject to the switching to the manual driving even if the driver is not ready for the manual driving.

In this regard, in this technical field, the development of an automatic driving system has been desired that inhibits switching to manual driving unintended by a driver in the case of a manual driving operation input by mistake during an automatic driving control.

An aspect of the invention is An automatic driving system including: an electronic control device including a computer, the electronic control unit configured to: detect a driving operation input amount by a driver during an automatic driving control for a vehicle; determine whether or not the driver is able to start manual driving during the automatic driving control for the vehicle; output a signal for performing switching from automatic driving to the manual driving based on a result of a comparison between the driving operation input amount and a driving switching threshold that is a threshold for the switching from the automatic driving to the manual driving; set the driving switching threshold to a first driving switching threshold when it is determined that the driver is able to start the manual driving; and set the driving switching threshold to a second driving switching threshold exceeding the first driving switching threshold when it is determined that the driver is not able to start the manual driving. According to this aspect, the automatic driving system can inhibit inappropriate switching to the manual driving unintended by the driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
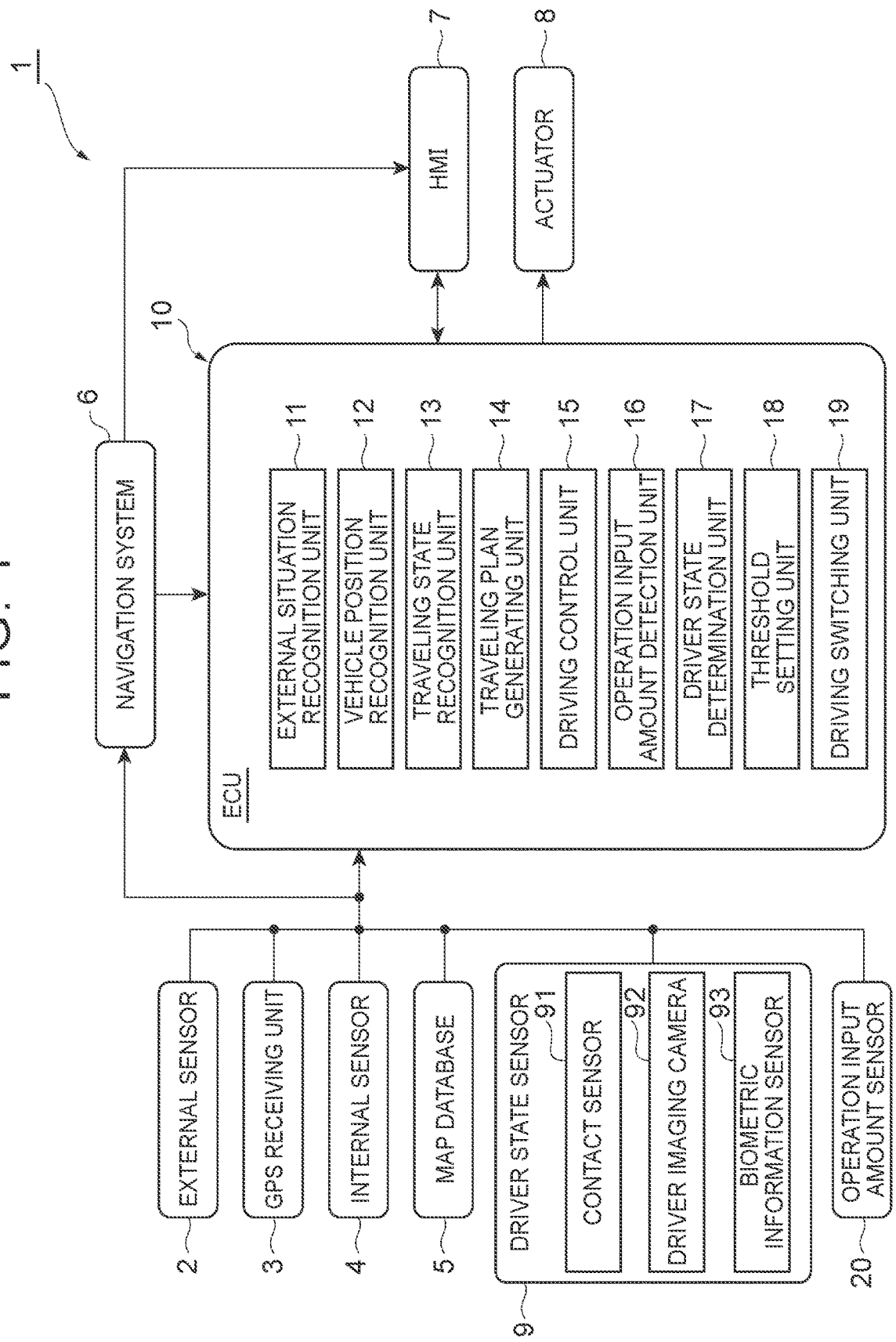
FIG. 1 is a block diagram illustrating a configuration overview of an automatic driving system according to an embodiment of the invention.

Hereinafter, an embodiment of the invention will be described with reference to accompanying drawings. In the following description, the same reference numerals will be used to refer to the same or like elements and redundant description thereof will be omitted.

FIG. 1 is a diagram illustrating a configuration overview of an automatic driving system 1 according to the embodiment of the invention. According to FIG. 1, the automatic driving system 1 according to this embodiment is a device that is mounted in a vehicle and performs an automatic driving control for the vehicle. This automatic driving system 1 is provided with a function for performing switching from automatic driving to manual driving in a case where a manual driving operation is performed by a driver during the automatic driving control for the vehicle. The automatic driving means a driving state where the vehicle is allowed to travel in an automatic manner by the automatic driving system 1. The manual driving means the driving of the vehicle being performed by the vehicle driver's manual driving operation.

The automatic driving system 1 is provided with an electronic control unit (ECU) 10. The ECU 10 is an electronic control unit that controls the traveling of the vehicle. The ECU 10 is configured to have a computer as a main component, and the computer includes a central processing unit (CPU), a read-only memory (ROM), and a random access memory (RAM). The ECU 10 will be described in detail later.

Each of an external sensor 2, a global positioning system (GPS) receiving unit 3, an internal sensor 4, a map database 5, a navigation system 6, a human machine interface (HMI) 7, an actuator 8, a driver state sensor 9, and an operation input amount sensor 20 is connected to the ECU 10.

The external sensor 2 is a detecting instrument that detects an external situation which is information regarding the vicinity of the vehicle. The external sensor 2 includes at least one of a camera, radar, and laser imaging detection and ranging (LIDAR).

The camera is an imaging instrument that images the external situation regarding the vehicle. The camera is disposed on, for example, a back side of a windshield of the vehicle. The camera may be a monocular camera or may be a stereo camera. The stereo camera has two imaging units that are placed to reproduce a binocular disparity. Depth-direction information is also included in the information imaged by the stereo camera. In a case where the stereo camera is used, the camera can be used as an object detection unit that detects objects including preceding cars and obstacles.

The radar detects the obstacle outside the vehicle by using radio waves such as millimeter waves. The radar detects the obstacle and the like by transmitting the radio waves to the vicinity of the vehicle and receiving the radio waves reflected by the obstacle. The radar transmits, to the ECU 10, information regarding the detected obstacle.

The LIDAR detects the obstacle outside the vehicle by using light. The LIDAR measures a distance to a reflection point and detects the obstacle and the like by transmitting the light to the vicinity of the vehicle and receiving the light reflected by the obstacle and the like. The LIDAR transmits, to the ECU 10, information regarding the detected object. The camera, the LIDAR, the radar, and a communication instrument do not necessarily have to be provided in an overlapping manner.

The GPS receiving unit 3 measures positions of the vehicle, such as a latitude position and a longitude position of the vehicle, by receiving signals from at least three GPS satellites. The GPS receiving unit 3 outputs, to the ECU 10, the measured positional information of the vehicle. Any other means by which the latitude and longitude of the vehicle can be pinpointed can take the place of the GPS receiving unit 3. In addition, for checking by comparison between a sensor measurement result and map information (described later), it is preferable that a function for measuring an orientation of the vehicle is provided.

The internal sensor 4 is a detecting instrument that detects vehicle states of the vehicle. The internal sensor 4 is provided with at least one of a vehicle speed sensor, an acceleration sensor, and a yaw rate sensor as a sensor detecting a traveling state of the vehicle. The vehicle speed sensor is a detector that detects a speed of the vehicle. A vehicle wheel speed sensor is used as an example of the vehicle speed sensor. The vehicle wheel speed sensor is disposed with respect to a vehicle wheel of the vehicle or a member such as a drive shaft that rotates integrally with the vehicle wheel or rotates in synchronization with the vehicle wheel and detects a rotation speed of the vehicle wheel. The vehicle speed sensor outputs, to the ECU 10, the detected vehicle speed information, that is, vehicle wheel speed information. The acceleration sensor is a detector that detects accelerations of the vehicle. The acceleration sensor includes, for example, a longitudinal acceleration sensor detecting the acceleration of the vehicle in a longitudinal direction and a lateral acceleration sensor detecting a lateral acceleration of the vehicle. The acceleration sensor outputs, for example, vehicle acceleration information to the ECU 10. The yaw rate sensor is a detector that detects a yaw rate about a vertical axis of the center of gravity of the vehicle. A gyro sensor can be used as an example of the yaw rate sensor. The yaw rate sensor outputs, to the ECU 10, the detected yaw rate information of the vehicle.

The map database 5 is a database that is provided with the map information. The map database 5 is formed within, for example, a hard disk drive (HDD) that is mounted in the vehicle. The map information includes, for example, positional information regarding roads, road shape information (such as the number and type of lanes), and positional information regarding intersections and junctions. It is preferable that the map information also includes an output signal of the external sensor 2 for the use of positional information regarding shielding structures, such as buildings and walls, and simultaneous localization and mapping (SLAM) technology. The map database 5 may be stored in a computer in a facility such as an information processing center capable of communicating with the vehicle.

The navigation system 6 is a device that guides the driver of the vehicle to a destination set by the driver of the vehicle. The navigation system 6 calculates a traveling route of the vehicle based on the positional information of the vehicle measured by the GPS receiving unit 3 and the map information of the map database 5. The route may be a certain appropriate lane in a section having a plurality of the lanes. The navigation system 6, for example, calculates a target route from the position of the vehicle to the destination and notifies the driver of the target route by using a displayed mark and an audio output from a speaker. The navigation system 6 outputs, for example, information regarding the target route of the vehicle to the ECU 10. The navigation system 6 may be stored in the computer in the facility such as the information processing center capable of communicating with the vehicle.

The HMI 7 is an interface for information output and input between a vehicle passenger and the automatic driving system 1. The HMI 7 is provided with, for example, a display panel for image information display to the passenger, the speaker for the audio output, and an operation button or a touch panel for the passenger's input operation. When the input operation relating to an operation or stop of the automatic driving control is performed by the passenger, for example, the HMI 7 initiates or stops the automatic driving control by outputting a signal to the ECU 10. The HMI 7 may perform the information output to the passenger by using a wirelessly-connected portable information terminal or may receive the passenger's input operation by using a portable information terminal. In a case where the input operation by the passenger including the driver is in progress, the HMI 7 may output, to the ECU 10, an operation-in-progress signal that shows the input operation is in progress.

The actuator 8 is a device that executes the automatic driving control for the vehicle. The actuator 8 includes at least a throttle actuator, a brake actuator, and a steering actuator. The throttle actuator controls the amount of air supply to an engine, that is, a throttle opening degree, in accordance with a control signal from the ECU 10 and controls a driving force of the vehicle. In a case where the vehicle is a hybrid car or an electric car, the actuator 8 does not include the throttle actuator and the driving force is controlled by a control signal from the ECU 10 being input to a motor as a power source.

The brake actuator controls a brake system in accordance with a control signal from the ECU 10 and controls a braking force given to the vehicle wheel of the vehicle. A hydraulic brake system can be used as an example of the brake system. The steering actuator controls, in accordance with a control signal from the ECU 10, driving of an assist motor that controls a steering torque in an electric power steering system. In this manner, the steering actuator controls the steering torque of the vehicle.

The driver state sensor 9 is a sensor that detects states of the driver of the vehicle. The driver state sensor 9 includes, for example, a contact sensor 91, a driver imaging camera 92, and a biometric information sensor 93. The contact sensor 91 is a sensor that detects the driver's contact with a steering wheel. A pressure-sensitive sensor is used as an example of the contact sensor 91. The contact sensor 91 may be a capacitive sensor as well. This contact sensor 91 has, for example, a detection unit installed at a part of the steering wheel held by the driver. Two detection units may be disposed instead, one on a right side of the steering wheel and the other on a left side of the steering wheel. This contact sensor 91 may be used in combination with a sensor used for another application. The contact sensor 91 outputs a detection signal to the ECU 10.

The driver imaging camera 92 is a camera that images the driver in the vehicle. The driver imaging camera 92 is disposed to image an upper half of the driver's body, the driver's face, the driver's eye, or the like. A plurality of the driver imaging cameras 92 may be disposed. The driver imaging camera 92 outputs a captured image of the driver to the ECU 10.

The biometric information sensor 93 is a sensor that detects the driver's biometric information such as the driver's brain waves and pulse. The biometric information sensor 93 is, for example, a wearable device that is carried by the driver and has the form of glasses, a watch, a ring, a wristband, or the like. The biometric information sensor 93 outputs, to the ECU 10, the detected biometric information of the driver. All of the contact sensor 91, the driver imaging camera 92, and the biometric information sensor 93 may be provided as the driver state sensor 9. Alternatively, only one or two of these may be provided instead.

The operation input amount sensor 20 is a sensor that detects the amount of the driver's manual driving operation input. A steering angle sensor or a steering torque sensor is used as an example of the operation input amount sensor 20. In addition, an accelerator pedal stroke sensor or an accelerator pedal depression force sensor can also be used as the operation input amount sensor 20. The accelerator pedal stroke sensor is a sensor that detects an accelerator pedal depression amount. The accelerator pedal depression force sensor is a sensor that detects an accelerator pedal depression force. Furthermore, a brake pedal stroke sensor or a brake pedal depression force sensor can also be used as the operation input amount sensor 20. The brake pedal stroke sensor is a sensor that detects a brake pedal depression amount. The brake pedal depression force sensor is a sensor that detects a brake pedal depression force. All of these sensors may be used as the operation input amount sensor 20. Alternatively, only some of these may be used instead. The operation input amount sensor 20 outputs, for example, the amount or force of accelerator pedal depression by the driver and the amount or force of brake pedal depression by the driver to the ECU 10.

The ECU 10 is provided with an external situation recognition unit 11, a vehicle position recognition unit 12, a traveling state recognition unit 13, a traveling plan generating unit 14, a driving control unit 15, an operation input amount detection unit 16, a driver state determination unit 17, a threshold setting unit 18, and a driving switching unit 19.

The external situation recognition unit 11 recognizes the external situation regarding the vehicle based on detection results of the external sensor 2 such as the information imaged by the camera, the obstacle information of the radar, and the obstacle information of the LIDAR. The external situation includes, for example, a road width, a road shape, a situation of another vehicle in the vicinity of the vehicle, and a situation of the obstacle in the vicinity of the vehicle.

The vehicle position recognition unit 12 recognizes the position of the vehicle on a map based on the positional information of the vehicle received by the GPS receiving unit 3 and the map information of the map database 5. Hereinafter, the position of the vehicle on the map will be referred to as a "vehicle position".

The traveling state recognition unit 13 recognizes the traveling state of the vehicle based on detection results of the internal sensor 4 such as the vehicle speed information of the vehicle speed sensor, the acceleration information of the acceleration sensor, and the yaw rate information of the yaw rate sensor. The traveling state of the vehicle includes, for example, the speed, acceleration, and yaw rate of the vehicle. In addition, the traveling state recognition unit 13 may recognize a traveling direction of the vehicle based on a temporal change in the position of the vehicle.

The traveling plan generating unit 14 generates a target traveling path of the vehicle based on, for example, the target route calculated by the navigation system 6, the vehicle position recognized by the vehicle position recognition unit 12, and the external situation regarding the vehicle recognized by the external situation recognition unit 11 and including the position and orientation of the vehicle. The target traveling path is a trajectory of the vehicle in the target route. At this time, the traveling plan generating unit 14 generates the path of the vehicle based on the situation of the obstacle in the vicinity of the vehicle such that a contact with the obstacle is avoided.

The target route described above also includes a traveling route that is automatically generated based on the external situation and the map information when no explicit destination setting is performed by the driver, examples of which include traveling routes along roads according to the "driving support device" disclosed in Japanese Patent No. 5382218 (WO 2011/158347) and the "automatic driving device" disclosed in Japanese Patent Application Publication No. 2011-162132.

The traveling plan generating unit 14 generates a traveling plan in accordance with the generated path. In other words, the traveling plan generating unit 14 generates a traveling plan according to the target route set in advance based on at least the external situation which is information regarding the vicinity of the vehicle and the map information of the map database 5. Preferably, the traveling plan generating unit 14 outputs the traveling plan that it generates as one having a plurality of sets of the two elements of a target position p and a speed v by target point in a coordinate system fixed to the vehicle, that is, a plurality of configuration coordinates (p, v) with regard to a course of the vehicle. Herein, each of the target position p has at least x-coordinate and y-coordinate positions in the coordinate system fixed to the vehicle or information equivalent thereto. The traveling plan is not particularly limited insofar as the traveling plan shows a behavior of the vehicle. For the traveling plan, for example, a target time t may be used instead of the speed v. Alternatively, one to which the target time t and the orientation of the vehicle at that point in time are added may take the place of it.

Usually, future data on approximately several seconds ahead of a current time will suffice as the traveling plan. Depending on situations such as a right turn at the intersection and overtaking by the vehicle, however, data for tens of seconds is required. Accordingly, it is preferable that the number of the configuration coordinates of the traveling plan is variable and a distance between the configuration coordinates is also variable. In addition, a curve linking the configuration coordinates may be approximated with a spline function or the like and a parameter of the curve may be regarded as the traveling plan. Any known method can be used for the traveling plan generation insofar as the method can show the behavior of the vehicle.

The traveling plan may be data showing transitions of the vehicle speed of the vehicle, acceleration and deceleration of the vehicle, the steering torque of the vehicle, and the like at a time of the traveling of the vehicle in the course along the target route. The traveling plan may include a speed pattern of the vehicle, acceleration and deceleration patterns of the vehicle, and a steering pattern of the vehicle. The traveling plan generating unit 14 may generate the traveling plan such that the length of time required for the vehicle to reach the destination is minimized.

The speed pattern is, for example, data consisting of a target vehicle speed set in association with time for each target control position with respect to the target control positions set on the course with a predetermined interval of, for example, 1 m. The acceleration and deceleration patterns are, for example, data consisting of target acceleration and deceleration set in association with time for each target control position with respect to the target control positions set on the course with a predetermined interval of, for example, 1 m. The steering pattern is, for example, data consisting of a target steering torque set in association with time for each target control position with respect to the target control positions set on the course with a predetermined interval of, for example, 1 m.

The driving control unit 15 controls the traveling of the vehicle based on the traveling plan generated by the traveling plan generating unit 14. The driving control unit 15 outputs a control signal in accordance with the traveling plan to the actuator 8. In this manner, the driving control unit 15 controls the traveling of the vehicle such that the vehicle is automatically driven along the traveling plan. The driving control unit 15 initiates the automatic driving control in accordance with an initiation condition such as the driver's automatic driving control start button operation. In addition, the driving control unit 15 terminates the automatic driving control in accordance with, for example, the driver's automatic driving control end button operation. Furthermore, the driving control unit 15 terminates the automatic driving control in a case where the switching from the automatic driving to the manual driving is performed by the driving switching unit 19.

During the automatic driving control for the vehicle, the operation input amount detection unit 16 detects the amount of the manual driving operation input that includes at least one of the driver's vehicle steering wheel operation input, accelerator operation input, and brake operation input. For example, the operation input amount detection unit 16 detects the amount of the manual driving operation input that includes the steering wheel operation, the accelerator operation, or the brake operation during the automatic driving control for the vehicle based on detection signals of a steering angle sensor, a steering torque sensor, an accelerator pedal stroke sensor, an accelerator pedal depression force sensor, a brake pedal stroke sensor, a brake pedal depression force sensor, and the like of the internal sensor 4. The steering wheel operation input amount is, for example, a steering angle or a steering torque of the steering wheel. The accelerator operation input amount is, for example, the accelerator pedal depression amount or the accelerator pedal depression force. The brake operation input amount is, for example, the brake pedal depression amount or the brake pedal depression force.

The driver state determination unit 17 determines whether or not the driver is in a state where the manual driving can be initiated during the automatic driving control for the vehicle. For example, the driver state determination unit 17 detects the driver's state during the automatic driving control for the vehicle based on at least one of a detection result of the contact sensor 91 and the image captured by the driver imaging camera 92 and determines whether or not the driver is in the state where the manual driving can be initiated based on a result of the detection. The driver's being in the state where the manual driving can be initiated means that the driver is in a state where the manual driving can be prepared, and a state where the driver poses for the driving, a state where the driver is about to pose for the driving, a state where the driving is already in progress, and the like correspond thereto. The state where the manual driving can be initiated includes, for example, a state where the driver is in contact with the steering wheel of the vehicle. The state where the manual driving can be initiated may also include a state where the driver's face or line of sight is directed toward a front of the vehicle.

Specifically, the driver state determination unit 17 may determine whether or not the driver is in the state where the manual driving can be initiated based on a detection signal of the contact sensor 91. In a case where the driver is in contact with the steering wheel, for example, the driver state determination unit 17 determines that the driver is in the state where the manual driving can be initiated. In a case where the driver is not in contact with the steering wheel, for example, the driver state determination unit 17 determines that the driver is not in the state where the manual driving can be initiated.

In addition, the driver state determination unit 17 may determine whether or not the driver is in the state where the manual driving can be initiated based on the image captured by the driver imaging camera 92. In a case where the driver's posture is a driving posture set in advance such as a posture allowing the driving preparation with the face and the upper half of the body directed toward the front of the vehicle, for example, the driver state determination unit 17 determines that the driver is in the state where the manual driving can be initiated. In a case where the driver's posture is a non-driving posture set in advance such as a posture with a neck lowered for a portable information terminal operation and a posture on a tilted backrest of the driver's seat, for example, the driver state determination unit 17 determines that the driver is not in the state where the manual driving can be initiated. In a case where the driver's face or line of sight is directed toward the front of the vehicle, for example, the driver state determination unit 17 determines that the driver is in the state where the manual driving can be initiated. In a case where the driver's face or line of sight is not directed toward the front of the vehicle, for example, the driver state determination unit 17 determines that the driver is not in the state where the manual driving can be initiated. In a case where the driver's eyelids are open, for example, the driver state determination unit 17 determines that the driver is in the state where the manual driving can be initiated. In a case where the driver's eyelids are not open, for example, the driver state determination unit 17 determines that the driver is not in the state where the manual driving can be initiated.

In addition, the driver state determination unit 17 may determine whether or not the driver is in the state where the manual driving can be initiated based on an operation signal of an in-vehicle instrument such as the HMI 7. In a case where the driver's operation of the in-vehicle instrument such as an audio system, an air conditioner, the navigation system 6, and the HMI 7 is in progress, for example, the driver state determination unit 17 determines that the driver is not in the state where the manual driving can be initiated. In a case where a pre-set length of time, such as 1.0 second, has yet to elapse after an end of the driver's in-vehicle instrument operation, the driver state determination unit 17 determines that the driver is not in the state where the manual driving can be initiated. The driver state determination unit 17 does not necessarily have to distinguish whether a subject of the in-vehicle instrument operation in progress is the driver or the passenger.

The driver state determination unit 17 may determine whether or not the driver is in the state where the manual driving can be initiated based on a detection result of the biometric information sensor 93 such as a brain wave detection result and a pulse detection result. In a case where the driver is in a state of loss of consciousness, examples of which include a case where the driver's alertness is equal to or less than a threshold set in advance, the driver state determination unit 17 determines that the driver is not in the state where the manual driving can be initiated. Known methods can be employed for the calculation of the driver's alertness.

The threshold setting unit 18 sets a driving switching threshold. The driving switching threshold is a threshold that is used for the switching from the automatic driving to the manual driving to be performed. The driving switching threshold is set for each type of the operation input amounts used for the switching from the automatic driving to the manual driving of the vehicle. Examples of the types of the operation input amounts include the types of the steering angle of the steering wheel, the steering torque of the steering wheel, the accelerator pedal depression amount, the accelerator pedal depression force, the brake pedal depression amount, and the brake pedal depression force. The threshold setting unit 18 sets only one driving switching threshold in a case where, for example, only one type of the operation input amount is used for the switching from the automatic driving to the manual driving of the vehicle.

For example, the threshold setting unit 18 sets a steering angle threshold as the driving switching threshold corresponding to the steering angle of the steering wheel. For example, the threshold setting unit 18 sets a steering torque threshold as the driving switching threshold corresponding to the steering torque of the steering wheel. For example, the threshold setting unit 18 sets an accelerator depression amount threshold as the driving switching threshold corresponding to the accelerator pedal depression amount. For example, the threshold setting unit 18 sets an accelerator depression force threshold as the driving switching threshold corresponding to the accelerator pedal depression force. For example, the threshold setting unit 18 sets a brake depression amount threshold as the driving switching threshold corresponding to the brake pedal depression amount. For example, the threshold setting unit 18 sets a brake depression force threshold as the driving switching threshold corresponding to the brake pedal depression force. The driving switching threshold in the following description corresponds to the six threshold described above, too.

In a case where it is determined by the driver state determination unit 17 that the driver is in the state where the manual driving can be initiated, the threshold setting unit 18 sets a first driving switching threshold as a threshold for manual driving switching. In a case where it is determined by the driver state determination unit 17 that the driver is not in the state where the manual driving can be initiated, the threshold setting unit 18 sets a second driving switching threshold exceeding the first driving switching threshold as the threshold for the manual driving switching. A value that exceeds the first driving switching threshold is set as the second driving switching threshold. In other words, a driving switching threshold less likely to allow the switching to the manual driving than the first driving switching threshold is set as the second driving switching threshold.

When the steering wheel operation input amount increases, for example, a case might arise where the operation input amount increases as a negative value as the driver's manual driving operation increases, examples of which include a case where the steering wheel steering angle increases as a negative value. In this case, a value that exceeds an absolute value of the first driving switching threshold is set as an absolute value of the second driving switching threshold. In other words, the setting of the value exceeding the first driving switching threshold as the second driving switching threshold includes the setting of the value exceeding the absolute value of the first driving switching threshold as the absolute value of the second driving switching threshold.

Figure 2:
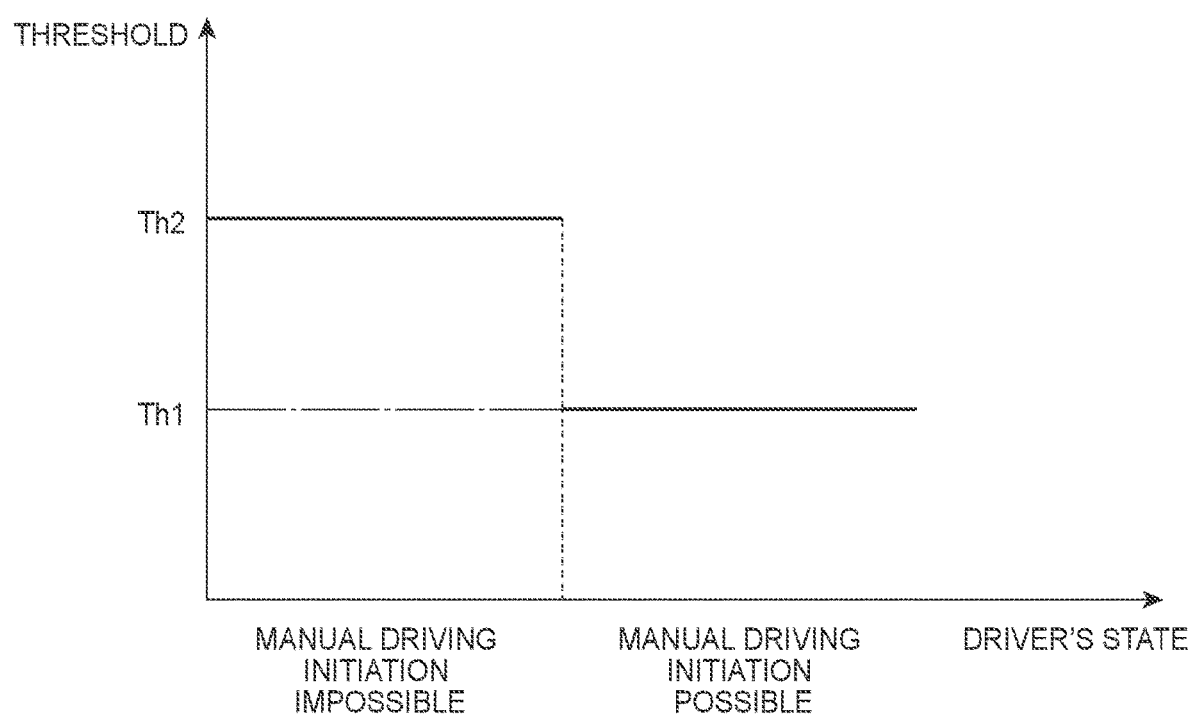
FIG. 2 is a diagram illustrating an example of a relationship between a driver state and a driving switching threshold in the automatic driving system that is illustrated in FIG. 1.

FIG. 2 is a graph illustrating a case where a first driving switching threshold Th1 and a second driving switching threshold Th2 are fixed values. In a case where it is determined that the driver is not in the state where the manual driving can be initiated, the threshold setting unit 18 sets, as the threshold for the manual driving switching, the second driving switching threshold Th2 exceeding the first driving switching threshold Th1 pertaining to a case where it is determined that the driver is in the state where the manual driving can be initiated as illustrated in FIG. 2. These first driving switching threshold Th1 and second driving switching threshold Th2 are respectively set as, for example, thresholds for the above-described steering angle threshold, steering torque threshold, accelerator depression amount threshold, accelerator depression force threshold, brake depression amount threshold, and brake depression force threshold.

In FIG. 1, the threshold setting unit 18 may use the first driving switching threshold as an initial setting. In this case, the threshold setting unit 18 changes the threshold for the manual driving switching from the first driving switching threshold, which is the initial setting, to the second driving switching threshold when it is determined by the driver state determination unit 17 that the driver is not in the state where the manual driving can be initiated. Alternatively, the threshold setting unit 18 may use the second driving switching threshold as the initial setting. In this case, the threshold setting unit 18 changes the threshold for the manual driving switching from the second driving switching threshold, which is the initial setting, to the first driving switching threshold when it is determined by the driver state determination unit 17 that the driver is in the state where the manual driving can be initiated.

Figure 3:
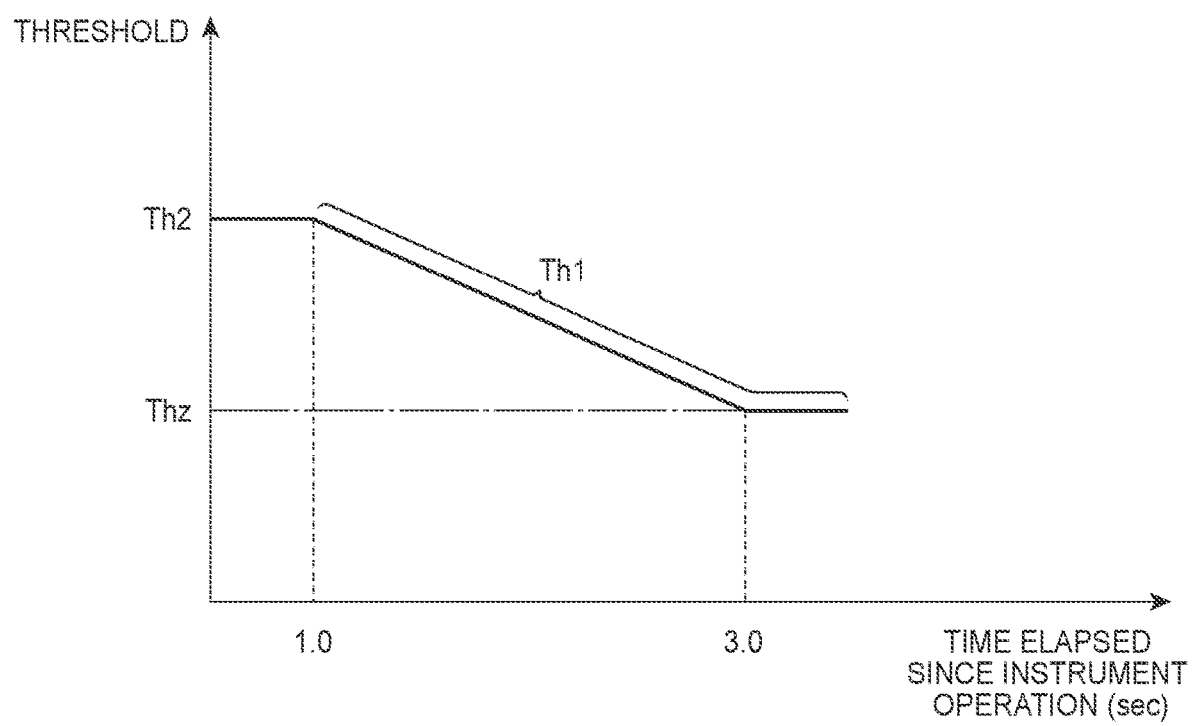
FIG. 3 is a diagram illustrating another example of the relationship between the driver state and the driving switching threshold in the automatic driving system that is illustrated in FIG. 1.

The first driving switching threshold Th1 and the second driving switching threshold Th2 are not limited to the fixed values and may be variable values. FIG. 3 is a graph illustrating a change in the driving switching threshold depending on the length of time elapsed since the operation of the in-vehicle instrument. The audio system, the air conditioner, the navigation system 6, the HMI 7, and the like correspond to examples of the in-vehicle instrument. The vertical axis represents the threshold and the horizontal axis represents the length of time elapsed since a termination of the operation of the in-vehicle instrument. At first, the driver state determination unit 17 determines that the driver is not in the state where the manual driving can be initiated, as illustrated in FIG. 3, until, for example, a predetermined standby time such as 1.0 second elapses from the termination of the operation of the in-vehicle instrument. In the case of the elapse of the predetermined standby time from the termination of the operation of the in-vehicle instrument, for example, the driver state determination unit 17 determines that the driver is in the state where the manual driving can be initiated.

In FIG. 3, the second driving switching threshold Th2 is a fixed value and the first driving switching threshold Th1 is a value that changes. The first driving switching threshold Th1 changes within a range that falls short of the second driving switching threshold Th2. The threshold setting unit 18 changes the first driving switching threshold Th1 in accordance with the time elapsed since the termination of the operation of the in-vehicle instrument. The threshold setting unit 18 sets the first driving switching threshold Th1 to decrease as the elapsed time increases until, for example, the elapsed time reaches a predetermined stabilization time such as 3.0 seconds. In a case where the elapsed time exceeds the predetermined stabilization time, the threshold setting unit 18 sets the first driving switching threshold Th1 to a set value THz determined in advance. It should be noted that both the first driving switching threshold Th1 and the second driving switching threshold Th2 may be values that change.

The driving switching unit 19 in FIG. 1 performs a driving switching processing. In other words, the driving switching unit 19 determines whether or not the amount of the driver's manual driving operation input exceeds the driving switching threshold during the automatic driving control, and performs a processing for the switching from the automatic driving to the manual driving in a case where the operation input amount exceeds the driving switching threshold. In other words, since the first driving switching threshold is set as the driving switching threshold in a case where the driver is in the state where the manual driving can be initiated, the driving switching unit 19 performs the processing for the switching from the automatic driving to the manual driving in a case where the operation input amount exceeds the first driving switching threshold. Since the second driving switching threshold is set as the driving switching threshold in a case where the driver is not in the state where the manual driving can be initiated, the driving switching unit 19 performs the processing for the switching from the automatic driving to the manual driving in a case where the operation input amount exceeds the second driving switching threshold. In addition, in a case where a plurality of types of the operation input amounts are used for the switching from the automatic driving to the manual driving of the vehicle, the driving switching unit 19 may perform the processing for the switching from the automatic driving to the manual driving when at least one of the plurality of types of the operation input amounts exceeds the driving switching threshold. For example, the driving switching unit 19 may perform the processing for the switching to the manual driving when any one of the operation input amounts exceeds the driving switching threshold or may perform the processing for the switching to the manual driving when two or more types of the operation input amounts exceed the driving switching threshold. The driving switching unit 19 outputs, to the driving control unit 15, a control signal regarding the termination of the automatic driving control. Then, the automatic driving control is terminated and the switching from the automatic driving to the manual driving is carried out. In addition, the driving switching unit 19 may, for example, set a manual driving flag and reset an automatic driving flag as the driving switching processing. Then, it is recognized that the switching from the automatic driving to the manual driving is carried out by the ECU 10.

In an alternative aspect, the driving switching unit 19 may perform the processing for the switching from the automatic driving to the manual driving when a duration that is the length of time during which the operation input amount exceeds the driving switching threshold exceeds a duration threshold in a case where the amount of the driver's manual driving operation input exceeds the driving switching threshold. The duration threshold is, for example, provided for each type of the operation input amounts used for the switching from the automatic driving to the manual driving of the vehicle.

In this case, the threshold setting unit 18 sets a steering angle time threshold as, for example, the duration threshold corresponding to the steering angle of the steering wheel. For example, the threshold setting unit 18 sets a steering torque time threshold as the duration threshold corresponding to the steering torque of the steering wheel. For example, the threshold setting unit 18 sets an accelerator depression amount time threshold as the duration threshold corresponding to the accelerator pedal depression amount. For example, the threshold setting unit 18 sets an accelerator depression force time threshold as the duration threshold corresponding to the accelerator pedal depression force. For example, the threshold setting unit 18 sets a brake depression amount time threshold as the duration threshold corresponding to the brake pedal depression amount. For example, the threshold setting unit 18 sets a brake depression force time threshold as the duration threshold corresponding to the brake pedal depression force. The duration threshold in the following description corresponds to the six threshold described above, too.

The following description relates to the aspect in which the processing for the switching from the automatic driving to the manual driving is performed in a case where the duration during which the operation input amount exceeds the driving switching threshold exceeds the duration threshold and the amount of the driver's operation input exceeds the driving switching threshold. In a case where it is determined by the driver state determination unit 17 that the driver is in the state where the manual driving can be initiated, the threshold setting unit 18 sets a first duration threshold as the duration threshold for the manual driving switching. In a case where it is determined by the driver state determination unit 17 that the driver is not in the state where the manual driving can be initiated, the threshold setting unit 18 sets a second duration threshold exceeding the first duration threshold as the duration threshold. In a case where it is determined that the driver is not in the state where the manual driving can be initiated, the threshold setting unit 18 sets the duration threshold such that the switching to the manual driving becomes less likely.

The threshold setting unit 18 may use the first duration threshold as an initial setting. In this case, the threshold setting unit 18 changes the threshold for the manual driving switching from the first duration threshold, which is the initial setting, to the second duration threshold when it is determined by the driver state determination unit 17 that the driver is not in the state where the manual driving can be initiated. Alternatively, the threshold setting unit 18 may use the second duration threshold as the initial setting. In this case, the threshold setting unit 18 changes the threshold for the manual driving switching from the second duration threshold, which is the initial setting, to the first duration threshold when it is determined by the driver state determination unit 17 that the driver is in the state where the manual driving can be initiated.

The external situation recognition unit 11, the vehicle position recognition unit 12, the traveling state recognition unit 13, the traveling plan generating unit 14, the driving control unit 15, the operation input amount detection unit 16, the driver state determination unit 17, the threshold setting unit 18, and the driving switching unit 19 described above may be configured by introduction, into the ECU 10, of software or programs realizing the respective functions. In addition, some or all of these may be configured as extra electronic control units. Furthermore, the threshold setting unit 18 is optional. In this case, the driving switching unit 19 performs the switching to the manual driving by using the first driving switching threshold in a case where it is determined by the driver state determination unit 17 that the driver is in the state where the manual driving can be initiated and performs the switching to the manual driving by using the second driving switching threshold in a case where it is determined by the driver state determination unit 17 that the driver is not in the state where the manual driving can be initiated.

Hereinafter, an operation of the automatic driving system 1 according to this embodiment will be described.

Figure 4:
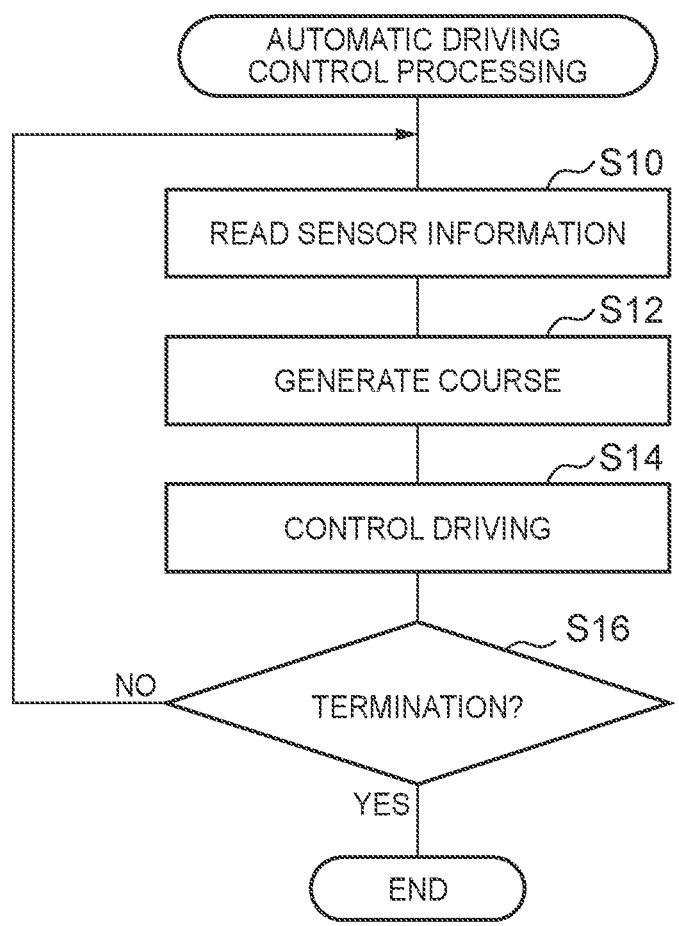
FIG. 4 is a flowchart illustrating an automatic driving control processing of the automatic driving system that is illustrated in FIG. 1.

FIG. 4 is a flowchart illustrating an overview of an automatic driving control processing of the automatic driving system 1 according to this embodiment. The automatic driving control processing is a processing for performing the automatic driving control for the vehicle. The automatic driving control processing is initiated by, for example, an automatic driving control initiation operation and is executed by the ECU 10.

A sensor information reading processing is performed first as illustrated in Step S10 in FIG. 4. This processing is a processing for reading the information of the external sensor 2, the GPS receiving unit 3, the internal sensor 4, and the map database 5. For example, the external situation recognition unit 11 reads the information detected by the external sensor 2 and recognizes the road width, the road shape, the traveling situation of another vehicle in the vicinity of the vehicle, the situation of the obstacle in the vicinity of the vehicle, and the like based on the information detected by the external sensor 2. In addition, the vehicle position recognition unit 12 reads the positional information of the vehicle received by the GPS receiving unit 3 and the map information of the map database 5 and recognizes the position of the vehicle on the map. Furthermore, the traveling state recognition unit 13 reads the information detected by the internal sensor 4 and recognizes the traveling state of the host vehicle based on the detected information. The traveling state of the vehicle includes, for example, the speed, acceleration, and yaw rate of the vehicle.

Then, the processing proceeds to Step S12 and a course generation processing is performed. The course generation processing is a processing for generating the course of the vehicle. For example, the traveling plan generating unit 14 generates a target course of the vehicle based on the external situation regarding the vehicle such as the target route calculated by the navigation system 6, the vehicle position recognized by the vehicle position recognition unit 12, and a lane shape and the presence or absence of the obstacle recognized by the external situation recognition unit 11. At this time, the course is generated such that the vehicle proceeds along the lane in a case where no obstacle is present in front of the vehicle and the course of the vehicle is generated such that the contact with the obstacle is avoided in a case where the obstacle is present.

Then, the processing proceeds to Step S14 and a driving control processing is performed. The driving control processing is a processing for performing the automatic driving control for the traveling of the vehicle along the course generated in Step S12. For example, the driving control unit 15 outputs a control signal to the actuator 8. Then, an operation of the actuator 8 causes a steering operation, a driving operation, or a braking operation to be performed on the vehicle and the vehicle is automatically driven along the target course.

Then, the processing proceeds to Step S16 and it is determined whether or not the automatic driving control is to be terminated. For example, the driving control unit 15 terminates the automatic driving control in a case where a control termination condition is satisfied and continues with the automatic driving control in a case where the control termination condition is not satisfied. A control termination operation being performed by the driver, the vehicle reaching a control end point, the manual driving operation input exceeding the driving switching threshold being present, and the like correspond to the control termination condition. The processing returns to Step S10 in a case where it is determined in Step S16 that the automatic driving control is not to be terminated. In contrast, a series of the control processing illustrated in FIG. 4 is terminated in a case where it is determined in Step S16 that the automatic driving control is to be terminated.

Figure 5:
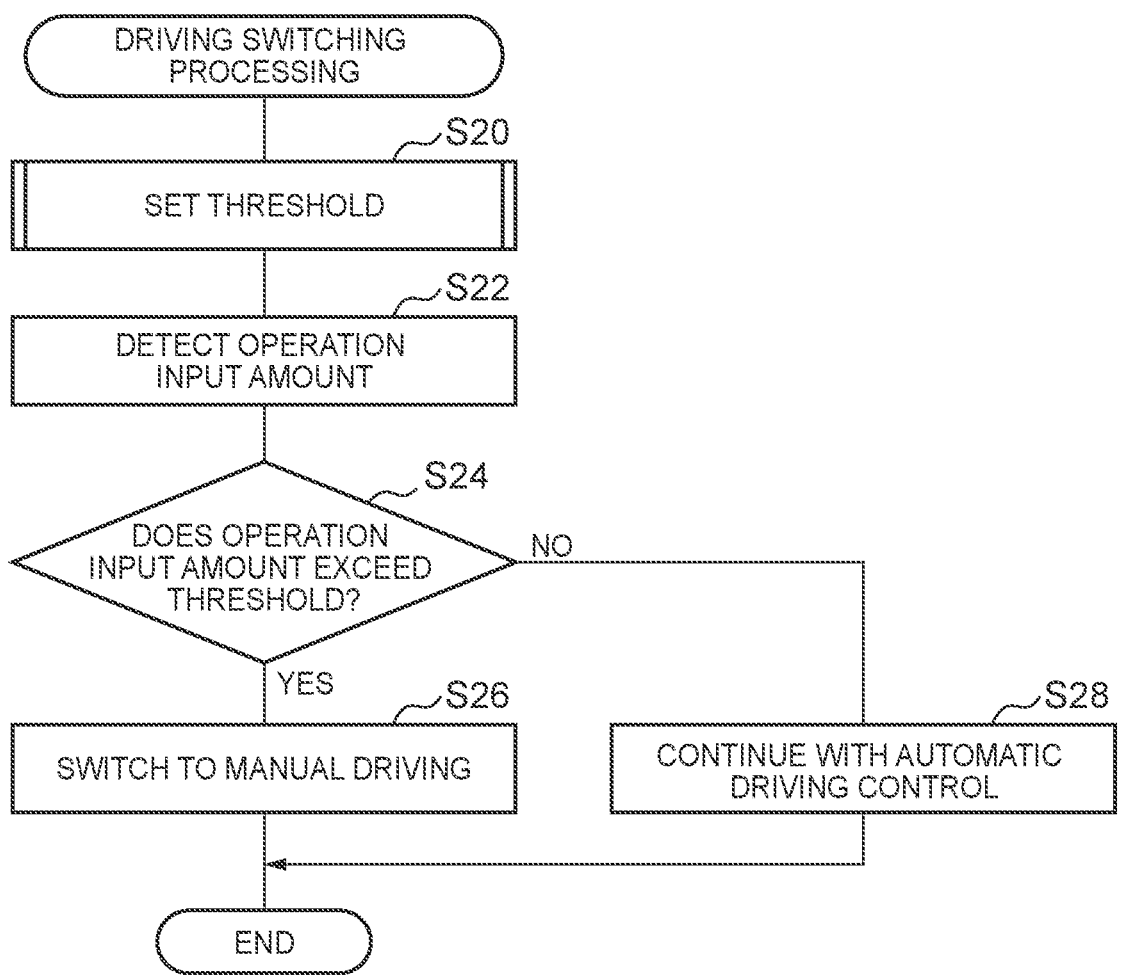
FIG. 5 is a flowchart illustrating a driving switching processing of the automatic driving system that is illustrated in FIG. 1.

FIG. 5 is a flowchart illustrating the driving switching processing of the automatic driving system 1 according to this embodiment. The driving switching processing is a processing for performing the driving switching from the automatic driving to the manual driving in a case where the manual driving operation input exceeds the driving switching threshold during the automatic driving control for the vehicle. This driving switching processing is, for example, executed by the ECU 10 and is initiated in line with the initiation of the automatic driving control. The driving switching processing is repeatedly executed during the automatic driving control and is terminated in line with the termination of the automatic driving control.

A threshold setting processing is performed first as illustrated in Step S20 in FIG. 5. The threshold setting processing is a processing for setting the driving switching threshold. As this threshold setting processing, the threshold setting unit 18 sets the first driving switching threshold as the threshold for the manual driving switching in a case where it is determined by the driver state determination unit 17 that the driver is in the state where the manual driving can be initiated. In a case where it is determined by the driver state determination unit 17 that the driver is not in the state where the manual driving can be initiated, the threshold setting unit 18 sets the second driving switching threshold exceeding the first driving switching threshold as the threshold for the manual driving switching.

Then, the processing proceeds to Step S22 and an operation input amount detection processing is performed. The operation input amount detection processing is a processing for detecting the amount of the manual driving operation input. The steering wheel operation, the accelerator pedal operation, the brake pedal operation, and the like correspond to the manual driving operation. As this operation amount detection processing, the operation input amount detection unit 16 detects the amounts of the driver's steering wheel operation input, accelerator operation input, and brake operation input to the vehicle based on, for example, the detection result of the internal sensor 4.

Then, the processing proceeds to Step S24 and the driving switching unit 19 determines whether or not the operation input amount detected in the operation input amount detection processing exceeds the driving switching threshold. This determination processing in Step S24 may be performed with regard to all of the steering angle of the steering wheel, the steering torque of the steering wheel, the accelerator pedal depression amount, the accelerator pedal depression force, the brake pedal depression amount, and the brake pedal depression force. In some cases, however, this determination processing in Step S24 is performed with regard to some of the steering angle of the steering wheel, the steering torque of the steering wheel, the accelerator pedal depression amount, the accelerator pedal depression force, the brake pedal depression amount, and the brake pedal depression force. In addition, in the determination processing in Step S24, it may be determined whether or not the duration that is the length of time during which the operation input amount exceeds the driving switching threshold exceeds the duration threshold as the determination of whether or not the amount of the driver's manual driving operation input exceeds the driving switching threshold.

In a case where it is determined as a result of the determination processing in Step S24 that the operation input amount exceeds the driving switching threshold, the switching from the automatic driving to the manual driving is performed by the driving switching unit 19 in Step S26. For example, the driving switching unit 19 outputs, to the driving control unit 15, the control signal regarding the termination of the automatic driving control. In this case, the automatic driving control is terminated with the automatic driving control termination condition being satisfied in Step S16 in FIG. 4. This causes the switching from the automatic driving to the manual driving to be carried out. Once the processing in Step S26 is completed, a series of the control processing illustrated in FIG. 5 is terminated.

In a case where it is determined as a result of the determination processing in Step S24 that the operation input amount does not exceed the driving switching threshold, the automatic driving control continues to be executed by the driving control unit 15 in Step S28. In this case, the driving switching unit 19 determines that the manual driving operation is not performed or the manual driving operation to the point of the execution of the driving switching is not performed and continues with the automatic driving control. After the processing of Step S28, a series of the control processing illustrated in FIG. 5 is terminated.

According to this driving switching processing, the driving switching from the automatic driving to the manual driving can be performed in a case where the amount of the manual driving operation input exceeds the driving switching threshold during the automatic driving control for the vehicle. In a case where the driver is not in the state where the manual driving can be initiated at this time, the driving switching threshold is set to a higher value than in a case where the driver is in the state where the manual driving can be initiated such that the switching to the manual driving becomes less likely. Accordingly, in a case where the driver is not in the state where the manual driving can be initiated, easy switching to the manual driving is inhibited even in the presence of the driving operation input amount, and thus inappropriate switching to the manual driving can be suppressed.

Figure 6:
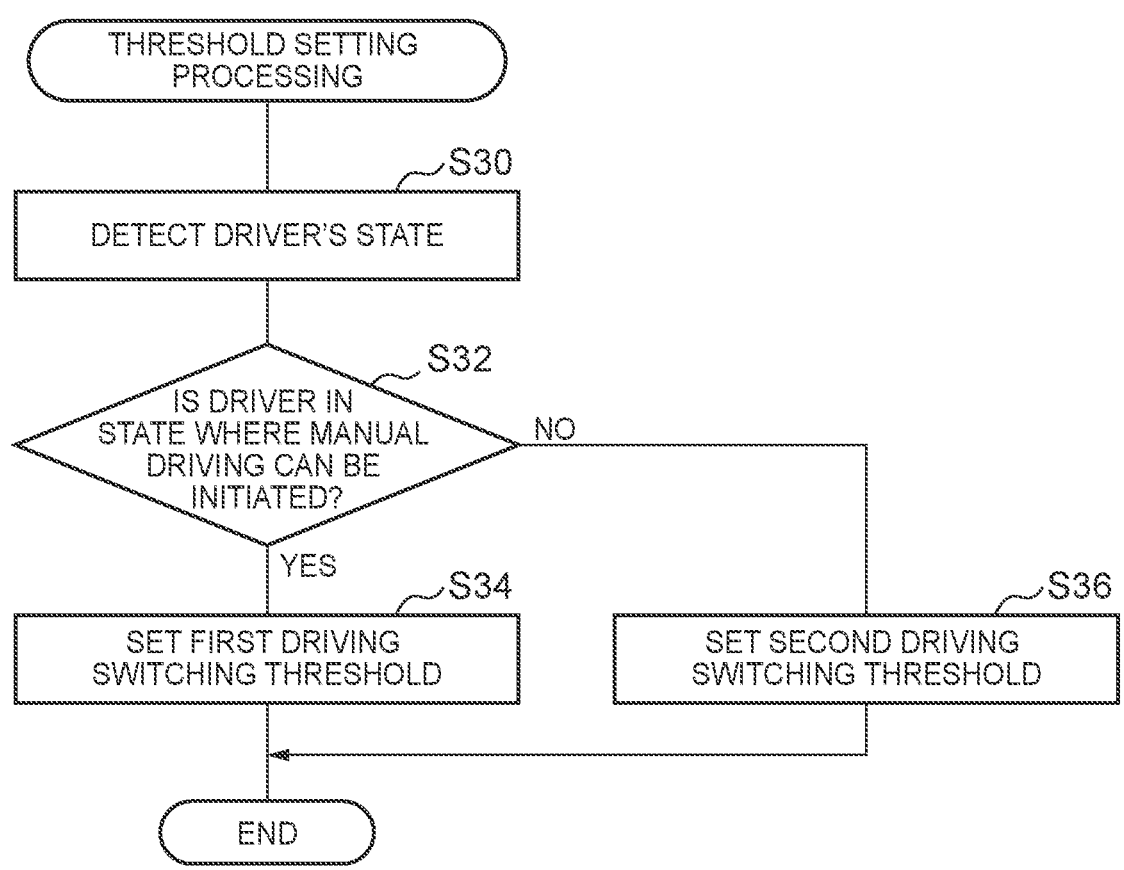
FIG. 6 is a flowchart illustrating a threshold setting processing of the automatic driving system that is illustrated in FIG. 1.

FIG. 6 is a flowchart illustrating the threshold setting processing of the automatic driving system 1 according to this embodiment. The threshold setting processing illustrated in FIG. 6 shows a specific example of the threshold setting processing in Step S20 illustrated in FIG. 5 and is a function as a subroutine of the threshold setting processing in Step S20.

A driver state detection processing is performed first as illustrated in Step S30 in FIG. 6. The driver state detection processing is a processing for detecting whether or not the driver of the vehicle is in the state where the manual driving can be initiated. For example, the driver state determination unit 17 detects the driver's state based on the detection result of the contact sensor 91 installed in the steering wheel. In this case, the driver state determination unit 17 can detect whether or not the driver is in contact with the steering wheel based on an output signal of the contact sensor 91. The driver state determination unit 17 recognizes that the driver is in the state where the manual driving can be initiated in a case where the driver is in contact with the steering wheel. The driver state determination unit 17 recognizes that the driver is not in the state where the manual driving can be initiated in a case where the driver is not in contact with the steering wheel.

The driver's state may also be detected based on the image captured by the driver imaging camera 92 in the driver state detection processing. In other words, the driver state determination unit 17 may detect whether or not the driver is in the state where the manual driving can be initiated based on the image captured by the driver imaging camera 92. For example, the driver state determination unit 17 detects the driver's posture by image-processing the image captured by the driver imaging camera 92. In addition, the driver state determination unit 17 may detect the direction of the driver's face or line of sight based on the image captured by the driver imaging camera 92. Furthermore, the driver state determination unit 17 may detect the opening state of the driver's eyelids based on the image captured by the driver imaging camera 92.

Moreover, the driver's state may also be detected based on the operation signal of the in-vehicle instrument such as the HMI 7 in the driver state detection processing. In other words, the driver state determination unit 17 may detect whether or not the driver is in the state where the manual driving can be initiated based on the operation signal of the in-vehicle instrument. For example, the driver state determination unit 17 can detect that the driver is not in the state where the manual driving can be initiated in a case where the driver's in-vehicle instrument operation is in progress or in a case where the pre-set length of time such as 1.0 second has yet to elapse after the end of the driver's in-vehicle instrument operation.

In addition, the driver's state may also be detected based on the detection result of the biometric information sensor 93, such as the brain wave detection result and the pulse detection result, in the driver state detection processing. In other words, the driver state determination unit 17 may detect whether or not the driver is in the state where the manual driving can be initiated based on a detection signal of the biometric information sensor 93. For example, the driver state determination unit 17 can detect that the driver is in the state where the manual driving can be initiated in a case where the driver is in a wakeful state and can detect that the driver is not in the state where the manual driving can be initiated in a case where the driver is in the state of loss of consciousness.

In the driver state detection processing in Step S30, the detection may be performed with regard to all of the detection result of the contact sensor 91, the image captured by the driver imaging camera 92, the in-vehicle instrument operation result, and the detection result of the biometric information sensor 93. However, the driver's state may be detected by some of these as well.

Then, the processing proceeds to Step S32 and it is determined whether or not the driver is in the state where the manual driving can be initiated. This determination processing is a processing for determining whether or not the driver is in the state where the manual driving can be initiated based on the driver's state obtained in the driver state detection processing in Step S30.

For example, the driver state determination unit 17 determines whether or not the driver is in the state where the manual driving can be initiated based on the detection signal of the contact sensor 91. In other words, the driver state determination unit 17 determines that the driver is in the state where the manual driving can be initiated in a case where the driver is in contact with the steering wheel and determines that the driver is not in the state where the manual driving can be initiated in a case where the driver is not in contact with the steering wheel.

In addition, the driver state determination unit 17 may determine whether or not the driver is in the state where the manual driving can be initiated based on the image captured by the driver imaging camera 92. In other words, the driver state determination unit 17 determines that the driver is in the state where the manual driving can be initiated in a case where the driver's posture is the driving posture set in advance and determines that the driver is not in the state where the manual driving can be initiated in a case where the driver's posture is the non-driving posture set in advance (such as the posture with the neck lowered for the portable information terminal operation and the posture on the tilted backrest of the driver's seat). Furthermore, the driver state determination unit 17 may determine that the driver is in the state where the manual driving can be initiated in a case where the driver's face or line of sight is directed toward the front of the vehicle and may determine that the driver is not in the state where the manual driving can be initiated in a case where in a case where the driver's face or line of sight is not directed toward the front of the vehicle. Moreover, the driver state determination unit 17 may determine that the driver is in the state where the manual driving can be initiated in a case where the driver's eyelids are open and may determine that the driver is not in the state where the manual driving can be initiated in a case where the driver's eyelids are not open. In the determination of the driver's state based on the image captured by the driver imaging camera 92, the determination may be performed based on all of the driver's posture, the direction of the face, the direction of the line of sight, and the eyelid opening state. However, the determination may be performed by some of these as well.

In addition, the driver state determination unit 17 may determine whether or not the driver is in the state where the manual driving can be initiated based on the operation signal of the in-vehicle instrument such as the HMI 7. In other words, the driver state determination unit 17 determines that the driver is not in the state where the manual driving can be initiated in a case where the driver's in-vehicle instrument operation is in progress and determines that the driver is in the state where the manual driving can be initiated in a case where the driver's in-vehicle instrument operation is not in progress. In this case, the driver state determination unit 17 may determine that the driver is not in the state where the manual driving can be initiated in a case where the pre-set length of time such as 1.0 second has yet to elapse after the end of the driver's in-vehicle instrument operation and may determine that the driver is in the state where the manual driving can be initiated in a case where the pre-set length of time has elapsed since the end of the driver's in-vehicle instrument operation.

In addition, the driver state determination unit 17 may determine whether or not the driver is in the state where the manual driving can be initiated based on the detection result of the biometric information sensor 93. In other words, the driver state determination unit 17 may determine that the driver is not in the state where the manual driving can be initiated in a case where the driver is in the state of loss of consciousness, examples of which include a case where the alertness is less than the threshold set in advance, and may determine that the driver is in the state where the manual driving can be initiated in a case where the driver is in the wakeful state, examples of which include a case where the alertness exceeds the threshold set in advance.

In a case where it is determined in Step S32 that the driver is in the state where the manual driving can be initiated, the threshold setting unit 18 sets the first driving switching threshold as the driving switching threshold in Step S34. In a case where it is determined in Step S32 that the driver is not in the state where the manual driving can be initiated, the threshold setting unit 18 sets the second driving switching threshold as the driving switching threshold in Step S36. The processing of Step S34 and the processing of Step S36 are respectively performed with regard to, for example, the steering angle threshold, the steering torque threshold, the accelerator depression amount threshold, the accelerator depression force threshold, the brake depression amount threshold, and the brake depression force threshold. Since the value that exceeds the first driving switching threshold is set as the second driving switching threshold, the driving switching threshold causing the switching to the manual driving to become less likely is set in a case where the driver is not in the state where the manual driving can be initiated than in a case where the driver is in the state where the manual driving can be initiated. Once the processing of Step S34 and the processing of Step S36 are terminated, a series of the control processing illustrated in FIG. 6 is terminated.

According to this threshold setting processing, the driving switching threshold is set such that the switching to the manual driving is less likely to be performed in a case where it is determined that the driver is not in the state where the manual driving can be initiated than in a case where it is determined that the driver is in the state where the manual driving can be initiated. Accordingly, when the driver is not in the state where the manual driving can be initiated, the switching to the manual driving attributable to the manual driving operation is allowed to be less likely to be performed than when the driver is in the state where the manual driving can be initiated.

Figure 7:
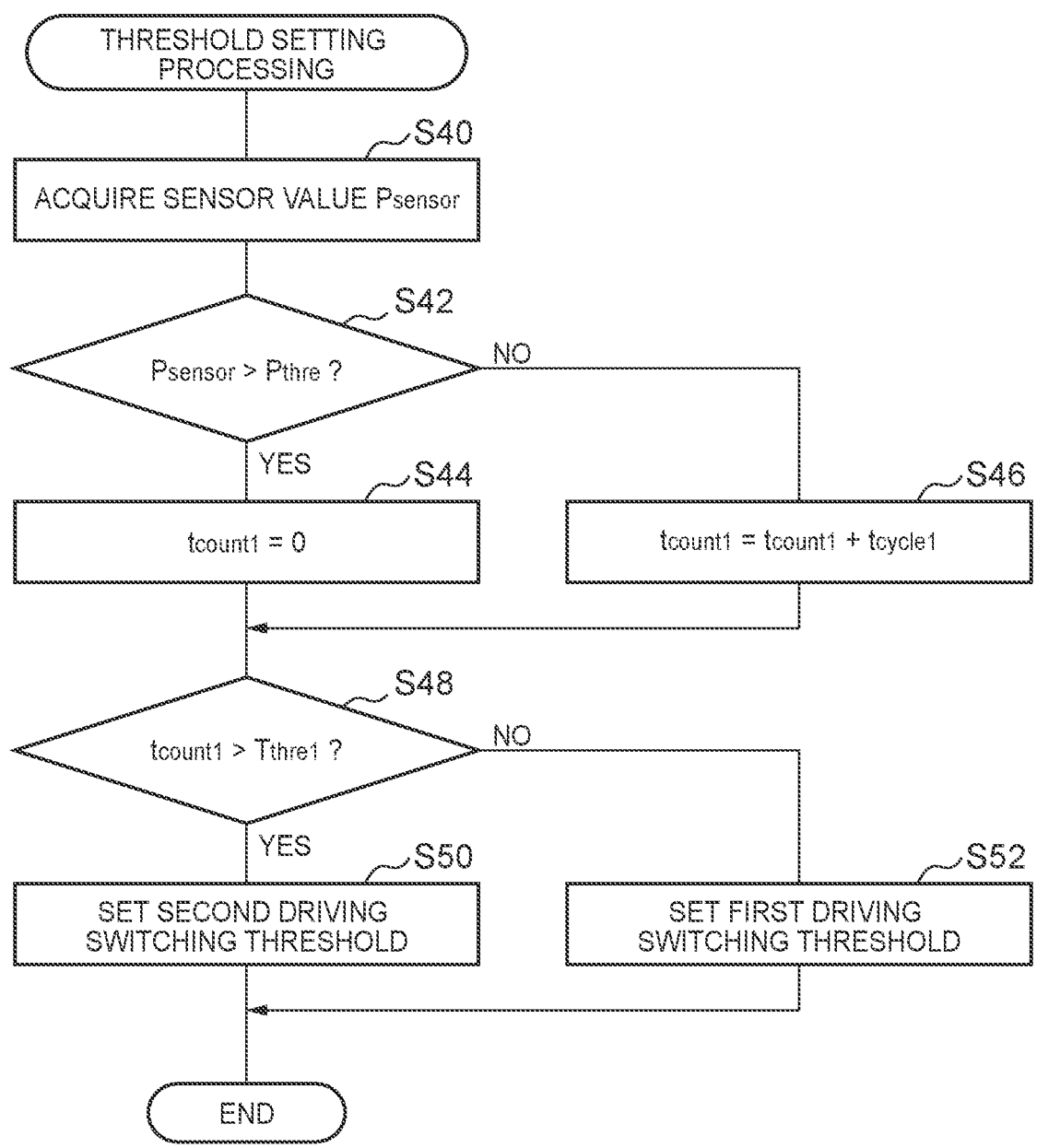
FIG. 7 is a flowchart illustrating an example of the threshold setting processing of the automatic driving system that is illustrated in FIG. 1.
Figure 8:
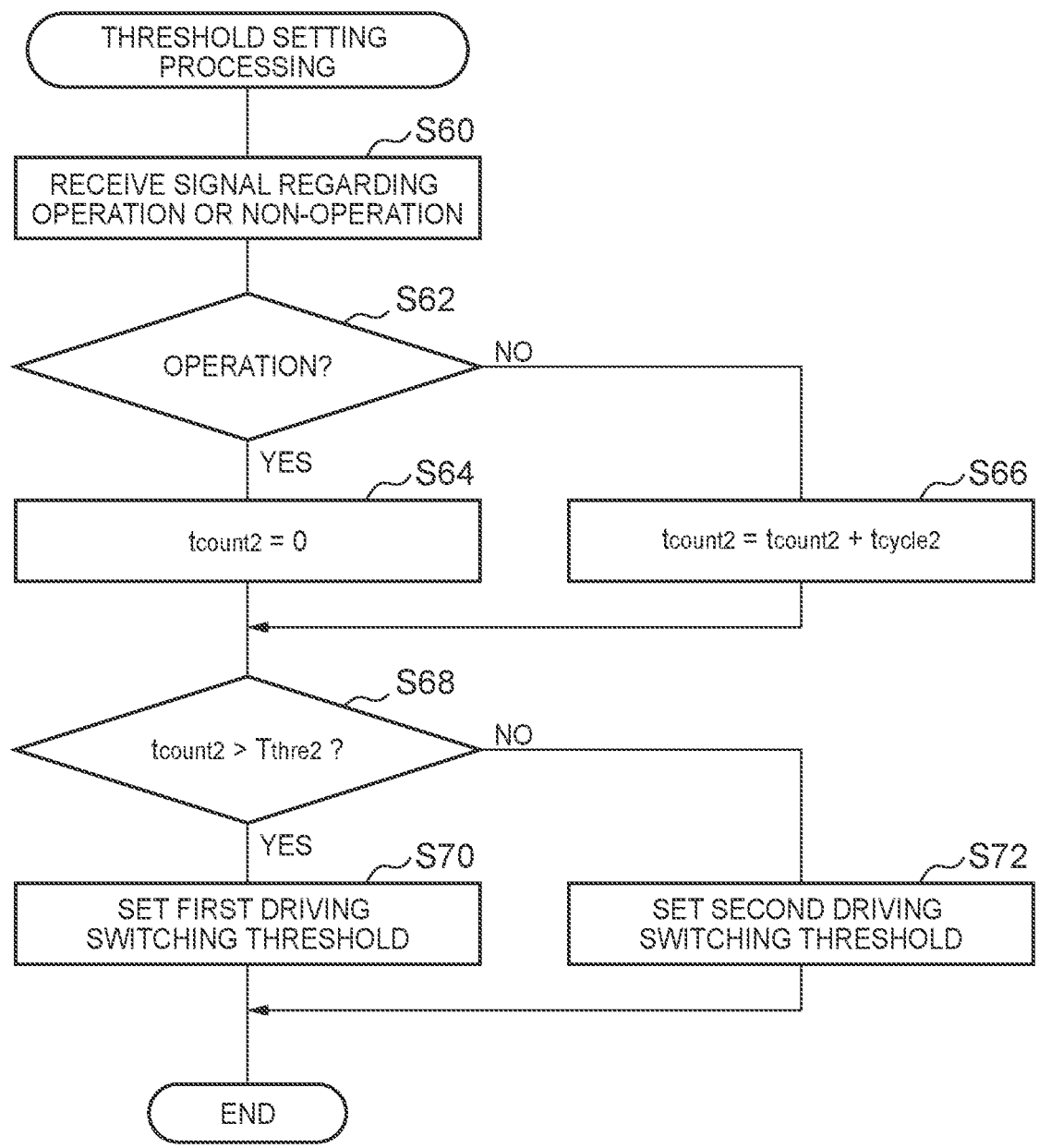
FIG. 8 is a flowchart illustrating another example of the threshold setting processing of the automatic driving system that is illustrated in FIG. 1.

FIG. 7 is a flowchart illustrating an example of the threshold setting processing of the automatic driving system 1 according to this embodiment. FIG. 8 is a flowchart illustrating another example of the threshold setting processing of the automatic driving system 1 according to this embodiment.

The threshold setting processing that is illustrated in FIG. 7 is a processing for setting the driving switching threshold by determining whether or not the driver is in a state where the manual driving operation is allowed based on whether or not the driver is in contact with the steering wheel. The threshold setting processing that is illustrated in FIG. 7 shows the threshold setting processing illustrated in FIG. 6 in more detail. This threshold setting processing is, for example, is initiated in line with the initiation of the automatic driving control and is executed by the ECU 10.

According to FIG. 7, the driver state determination unit 17 first acquires an output value Psensor of the contact sensor 91 in Step S40, and then determines in Step S42 whether or not the output value Psensor exceeds a threshold Pthre set in advance. In a case where it is determined in Step S42 that the output value Psensor exceeds the threshold Pthre, the driver state determination unit 17 resets a steering hand-off duration tcount1 and sets 0 in Step S44. In a case where it is determined in Step S42 that the output value Psensor does not exceed the threshold Pthre, the driver state determination unit 17 sets, to the steering hand-off duration tcount1, a value obtained by adding a cycle time tcycle1 to a previous value of the steering hand-off duration tcount1 in Step S46. The cycle time tcycle1 is a processing cycle time pertaining to the threshold setting processing illustrated in FIG. 7. Then, the driver state determination unit 17 determines in Step S48 whether or not the steering hand-off duration tcount1 exceeds a threshold Tthre1 set in advance. In a case where it is determined in Step S48 that the steering hand-off duration tcount1 exceeds the threshold Tthre1, the threshold setting unit 18 sets the second driving switching threshold as the driving switching threshold in Step S50. In a case where it is determined in Step S48 that the steering hand-off duration tcount1 does not exceed the threshold Tthre1, the threshold setting unit 18 sets the first driving switching threshold as the driving switching threshold in Step S52. Once the processing of Step S50 and the processing of Step S52 are completed, a series of the control processing illustrated in FIG. 7 is terminated.

According to the threshold setting processing that is illustrated in FIG. 7, it can be determined whether or not the driver is in the state where the manual driving can be initiated based on whether or not the steering wheel remains released by the driver for a period of time longer than a predetermined time such as the time which is equal to the threshold Tthre1. Accordingly, it can be simply and accurately determined, by the use of the contact sensor 91, whether or not the driver is in the state where the manual driving can be initiated during the setting of the driving switching threshold.

The threshold setting processing that is illustrated in FIG. 8 is a processing for setting the driving switching threshold by determining whether or not the driver is in the state where the manual driving can be initiated based on the length of time elapsed since the termination of the operation of the in-vehicle instrument by the driver. The threshold setting processing that is illustrated in FIG. 8 shows the threshold setting processing illustrated in FIG. 6 in more detail. The in-vehicle instrument is an instrument that can be operated by the driver, examples thereof including a navigation device, the audio system, and an air conditioning device. This threshold setting processing is, for example, is initiated in line with the initiation of the automatic driving control and is executed by the ECU 10.

According to FIG. 8, the driver state determination unit 17 first receives a signal regarding the operation or non-operation of the in-vehicle instrument in Step S60, and determines in Step S62 whether or not the in-vehicle instrument has been operated. In a case where it is determined in Step S62 that the in-vehicle instrument has been operated, the driver state determination unit 17 resets an elapsed time tcount2 from the time of the operation of the in-vehicle instrument and sets 0 in Step S64. In a case where it is determined in Step S62 that the in-vehicle instrument has not been operated, the driver state determination unit 17 sets, to the elapsed time tcount2, a value obtained by adding a cycle time tcycle2 to a previous value of the elapsed time tcount2 in Step S66. The cycle time tcycle2 is a processing cycle time pertaining to the threshold setting processing. Then, the driver state determination unit 17 determines in Step S68 whether or not the elapsed time tcount2 exceeds a threshold Tthre2 set in advance. In a case where it is determined in Step S68 that the elapsed time tcount2 exceeds the threshold Tthre2, the threshold setting unit 18 sets the first driving switching threshold as the driving switching threshold in Step S70. In a case where it is determined in Step S68 that the elapsed time tcount2 does not exceed the threshold Tthre2, the threshold setting unit 18 sets the second driving switching threshold as the driving switching threshold in Step S72. Once the processing of Step S70 and the processing of Step S72 are completed, a series of the control processing illustrated in FIG. 8 is terminated.

According to the driver state detection processing that is illustrated in FIG. 8, it can be determined whether or not the driver is in the state where the manual driving can be initiated based on whether or not a predetermined time, such as the time which is equal to the threshold Tthre2, has elapsed since the time of the in-vehicle instrument operation by the driver, and the driving switching threshold can be set in accordance with the state where the manual driving can be initiated.

As described above, according to the automatic driving system 1 of this embodiment, the switching to the manual driving is performed when the amount of the manual driving operation input exceeds the first driving switching threshold in a case where it is determined that the driver is in the state where the manual driving can be initiated and the switching to the manual driving is performed when the amount of the manual driving operation input exceeds the second driving switching threshold exceeding the first driving switching threshold in a case where it is determined that the driver is not in the state where the manual driving can be initiated during the automatic driving control for the vehicle. In other words, in a case where it is determined that the driver is not in the state where the manual driving can be initiated during the automatic driving control for the vehicle, the switching to the manual driving is performed by the use of the driving switching threshold causing the switching to the manual driving to become less likely than in a case where it is determined that the driver is in the state where the manual driving can be initiated. Accordingly, the switching to the manual driving is inhibited, compared to when the driver is in the state where the manual driving can be initiated, when the driver is not in the state where the manual driving can be initiated in the case of the manual driving operation input during the automatic driving control. Hence, the automatic driving system can suppress the inappropriate switching to the manual driving unintended by the driver.

In addition, in the automatic driving system 1 according to this embodiment, it is determined whether or not the driver is in the state where the manual driving can be initiated based on the detection result of the contact sensor 91 which can detect whether or not the driver is in contact with the steering wheel. Accordingly, it can be accurately determined whether or not the driver is in the state where the manual driving can be initiated. In other words, in a case where the driver is in contact with the steering wheel, it is more likely that the driver poses for the driving and the preparation for the driving is allowed, and thus an accurate determination can be made from the determination of whether or not the driver is in the state where the manual driving can be initiated based on whether or not the driver is in contact with the steering wheel.

What is claimed is:

1. An automatic driving system configured to switch a driving state of a vehicle from an automatic driving control to a manual driving control, the automatic driving system comprising:
    a driver state sensor that is configured to detect a state of a driver of the vehicle;
    an operation input amount sensor that is configured to detect an amount of the driver's manual driving operation input during the automatic driving control; and
    an electronic control unit programmed to:
    determine, while the driving state of the vehicle is in the automatic driving control, whether or not the driver is able to start the manual driving control based on a detection result of the driver state sensor;
    set a driving state switching threshold based on the determination of whether or not the driver is able to start the manual driving control;
    switch the driving state of the vehicle from the automatic driving control to the manual driving control when the amount of the driver's manual driving operation input detected by the operation input amount sensor is more than the driving switching threshold; and
    vary the driving switching threshold to decrease according to an elapsed time when the driver is able to start manual driving from a time when the driver is unable to start the manual driving.

2. The automatic driving system according to claim 1, wherein the electronic control unit is further configured to:
    set the driving state switching threshold to a first driving state switching threshold when it is determined that the driver is able to start the manual driving, and to set the driving state switching threshold to a second driving state switching threshold when it is determined that the driver is not able to start the manual driving, the second driving state switching threshold being higher than the first driving state switching threshold; and
    continue the driving state of the vehicle in the automatic driving control when the amount of the driver's manual driving operation input detected by the operation input amount sensor is equal to or less than the driving switching threshold.

3. The automatic driving system according to claim 1, wherein the driver state sensor includes a contact sensor configured to detect the driver's contact with a steering wheel of the vehicle and transmit a signal of a result of the detection to the electronic control unit, wherein the electronic control unit is further configured to determine whether or not the driver is able to start the manual driving based on the signal received from the contact sensor.

4. The automatic driving system according to claim 1, wherein the driver state sensor includes a biometric information sensor configured to detect the driver's biometric information and transmit a signal of a result of the detection to the electronic control unit, wherein the electronic control unit is further configured to determine whether or not the driver is able to start the manual driving based on the signal received from the biometric information sensor.

5. The automatic driving system according to claim 1, wherein the driver state sensor includes a camera configured to image the driver and transmit an image signal to the electronic control unit, wherein the electronic control unit is further configured to determine whether or not the driver is able to start the manual driving based on the image signal received from the camera.

6. The automatic driving system according to claim 5, wherein the electronic control unit is further configured to determine whether or not the driver is able to start the manual driving based on at least one of a driver's posture, a direction of the driver's line of sight or face, and a driver's eye-opening amount based on the image signal received from the camera.

7. The automatic driving system according to claim 1, wherein the driver's manual driving operation input detected by the operation input amount sensor includes at least one of a steering wheel operation input, an accelerator operation input, or a brake operation input.

8. A method of switching a driving state of a vehicle from an automatic driving control to a manual driving control, comprising:
    detecting a state of a driver of the vehicle;
    detecting an amount of the driver's manual driving operation input during the automatic driving control;
    determining, while the driving state of the vehicle is in the automatic driving control, whether or not the driver is able to start the manual driving control based on the detected state of the driver of the vehicle;
    setting a driving state switching threshold based on the determination of whether or not the driver is able to start the manual driving control;
    switching the driving state of the vehicle from the automatic driving control to the manual driving control when the detected amount of the driver's manual driving operation is more than the driving switching threshold; and
    varying the driving switching threshold to decrease according to an elapsed time when the driver is able to start manual driving from a time when the driver is unable to start the manual driving.

9. The method of claim 8, wherein
    the setting of the driving state switching threshold includes setting the driving state switching threshold to a first driving state switching threshold when it is determined that the driver is able to start the manual driving, and setting the driving state switching threshold to a second driving state switching threshold when it is determined that the driver is not able to start the manual driving, the second driving state switching threshold being higher than the first driving state switching threshold; and wherein
    the method further comprises keeping the driving state of the vehicle in the automatic driving control when the detected amount of the driver's manual driving operation input is equal to or less than the driving switching threshold.

10. The method of claim 8, wherein
the detecting of the state of the driver of the vehicle includes, detecting, using a contact sensor, a driver's contact with a steering wheel of the vehicle, and wherein
the determining of whether or not the driver is able to start the manual driving control is based at least in part on the detection of the driver's contact with the steering wheel of the vehicle.

11. The method of claim 8, wherein
the detecting of the state of the driver of the vehicle includes, detecting, using a biometric information sensor, the driver's biometric information, and wherein
the determining of whether or not the driver is able to start the manual driving control is based at least in part on the detection of the driver's biometric information.

12. The method of claim 8, wherein
the detecting of the state of the driver of the vehicle includes, detecting, using a camera, and wherein
the determining of whether or not the driver is able to start the manual driving control is based at least in part on the detection using the camera.

13. The method of claim 12, wherein
the detecting of the state of the driver of the vehicle is based on at least one of a driver's posture, a direction of the driver's line of sight or face, and a driver's eye-opening amount, using the camera.

14. The method of claim 8, wherein
the detecting of the amount of the driver's manual driving operation input includes a consideration of at least one of a steering wheel operation input, an accelerator operation input, and a brake operation input.

15. A non-transitory computer-readable medium storing instructions, the instructions comprising: one or more instructions that, when executed by one or more processors, cause the one or more processors to:
detect a state of a driver of the vehicle;
detect an amount of the driver's manual driving operation input during the automatic driving control;
determine, while the driving state of the vehicle is in the automatic driving control, whether or not the driver is able to start the manual driving control based on the detected state of the driver of the vehicle;
set a driving state switching threshold based on the determination of whether or not the driver is able to start the manual driving control;
switch the driving state of the vehicle from the automatic driving control to the manual driving control when the detected amount of the driver's manual driving operation is more than the driving switching threshold; and
varying the driving switching threshold to decrease according to an elapsed time when the driver is able to start manual driving from a time when the driver is unable to start the manual driving.

16. The non-transitory computer-readable medium of claim 15, wherein
the one or more instructions that, when executed by the one or more processors, cause the one or more processors to set the driving state switching threshold further cause the one or more processors to set the driving state switching threshold to a first driving state switching threshold when it is determined that the driver is able to start the manual driving, and set the driving state switching threshold to a second driving state switching threshold when it is determined that the driver is not able to start the manual driving, the second driving state switching threshold being higher than the first driving state switching threshold; and wherein
the one or more instructions further comprise instructions which, when executed by the one or more processors, cause the one or more processors to keep the driving state of the vehicle in the automatic driving control when the detected amount of the driver's manual driving operation input is equal to or less than the driving switching threshold.

17. The non-transitory computer-readable medium of claim 15, wherein
the one or more instructions that, when executed by the one or more processors, cause the one or more processors to detect the state of the driver, further cause the one or more processors to detect, using a contact sensor, a driver's contact with a steering wheel of the vehicle, and wherein
the one or more instructions that, when executed by the one or more processors, cause the one or more processors to determine whether or not the driver is able to start the manual driving control, further cause the one or more processors to determine whether or not the driver is able to start the manual driving control based at least in part on the detection of the driver's contact with the steering wheel of the vehicle.

18. The non-transitory computer-readable medium of claim 15, wherein
the one or more instructions that, when executed by the one or more processors,
cause the one or more processors to detect the state of the driver, further cause the one or more processors to detect, using a biometric information sensor, the driver's biometric information, and wherein
the one or more instructions that, when executed by the one or more processors, cause the one or more processors to determine whether or not the driver is able to start the manual driving control, further cause the one or more processors to determine whether or not the driver is able to start the manual driving control based at least in part on the detection of the driver's biometric information.

19. The non-transitory computer-readable medium of claim 15, wherein
the one or more instructions that, when executed by the one or more processors, cause the one or more processors to detect the state of the driver, further cause the one or more processors to detect the state of the driver using a camera, and wherein
the one or more instructions that, when executed by the one or more processors, cause the one or more processors to determine whether or not the driver is able to start the manual driving control, further cause the one or more processors to determine whether or not the driver is able to start the manual driving control based at least in part on the detection using the camera.

20. The non-transitory computer-readable medium of claim 19, wherein
the one or more instructions that, when executed by the one or more processors, cause the one or more processors to detect the state of the driver, further cause the one or more processors to detect the state of the driver based on at least one of a driver's posture, a direction of the driver's line of sight or face, and a driver's eye-opening amount, using the camera.

* * * * *